Feb. 24, 1942.    W. D. FOSTER ET AL    2,273,855
FILM HANDLING AND SOUND APPARATUS AND CONTROL THEREOF
Filed Jan. 15, 1934    4 Sheets-Sheet 1

INVENTORS

Feb. 24, 1942. W. D. FOSTER ET AL 2,273,855
FILM HANDLING AND SOUND APPARATUS AND CONTROL THEREOF
Filed Jan. 15, 1934 4 Sheets-Sheet 2

INVENTORS

Patented Feb. 24, 1942

2,273,855

UNITED STATES PATENT OFFICE 2,273,855

FILM HANDLING AND SOUND APPARATUS AND CONTROL THEREOF

Warren Dunham Foster, Washington Township, Bergen County, N. J., and Frederick Davenport Sweet, New York, N. Y., assignors, by direct and mesne assignments, to Kinatome Patents Corporation, Ridgewood, N. J., a corporation of New York Application January 15, 1934, Serial No. 706,764

32 Claims. (Cl. 88—16.2)

The present invention relates broadly to the art of photography and more particularly to improvements in apparatus for the handling of films, whether for the projection or taking of successive pictures or for the reproduction or recordation of images representing sound or for such projection of pictures and reproduction of sound jointly or such taking of pictures and recordation of sound jointly. It will be readily understood, however, that the present invention is applicable to many other uses.

An object of the present invention is to provide means for automatically placing a film in the full operative relation with all of the operable elements of the film handling apparatus and to rewind the film through such apparatus, all of such operations being under the control of a single actuating member of an improved design. A related object of the present invention is to provide a film handling apparatus to which a sound head may be bodily added and from which it may be bodily taken away at will, the operation of such sound head when it is in assembled relation with the projector likewise being under the control of the single actuating member.

An object of the present invention is automatically to control the speed of the drive in relation to the various operations to be performed by the apparatus. For example, the speed of the drive is automatically controlled concomitantly with the initiation of operation of the sound head so that the operator in changing from the projection of a still picture to the projection of a sound picture does not have to concern himself with a change in the speed of the travel of the film or from 960 to 1440 revolutions per minute since this change is automatically carried out for him by the apparatus. Similarly, for example, the rewinding operation is carried out automatically at a greatly increased speed over the silent projection or the sound projection speed. Moreover, the speed of the motor, and consequently its nose, is automatically reduced when the gate is open for threading the apparatus and automatically increased again concomitantly with the carrying out of the rewinding or projecting operations. In previous apparatus provided with manual means for changing the speed of the motor it has been common for the operator to reduce the speed by hand when he opens the gate for threading the apparatus because the noise of the rapidly idling motor is objectionable. Often when he has closed the gate and thrown in the clutch or clutches for restarting the projecting operation he has forgotten to increase the speed of motor and as a consequence the motor has not had sufficient power to move the film when its load is thus suddenly placed upon the motor. As a consequence the motor has occasionally stalled and the film becomes blistered or burned. (Note: The above must be definitely related to our own automatic apparatus.) In an apparatus built according to the present invention however, this difficulty cannot occur since the speed and power of the motor are automatically increased concomitantly with the actuation of the film feed.

Another important object of the invention is to permit the film to be moved backwardly continuously and free of the toothed feeding members at a high rate of speed for rewinding purposes or alternatively to be moved in a backward direction step by step so that pictures are projected as so-called motion pictures but in the reversed direction. Such reverse projection is highly esteemed by amateurs of motion picture apparatus as a humorous device. Moreover such reverse movement is highly valuable for sportsmen and others who are interested in analyzing motion. Expert instructors in golf, for example, have been able to explain the faults of their pupils much more effectively by pictures showing the various golf strokes backwardly than by pictures showing the stroke in the normal direction, both of such views of course being taken at high speed in order to produce the so-called slow motion.

Another object of the present invention is to provide an easily detachable sound head which contains a continuous sprocket or sprockets operated by the main apparatus through a connection which is automatically rendered effective when the sound unit is placed in assembled relation with the projecting apparatus per se. The projecting apparatus per se may be supplied with the Bundick and Proctor tension control system of feeding as shown in their copending application Serial Number 44,482 filed July 18, 1925, now Patent No. 1,944,022, or with the conventional continuous sprockets. The Bundick and Proctor control system of feeding is not adapted to the conventional type of sound reproduction since such sound reproduction or recordation requires a portion of the film which moves continuously at a uniform rate of speed. Under this system of feeding, however, any such portion of the film moves continuously. For other purposes, however, this system is much cheaper to manufacture, simpler in operation, and results in less wear upon the film than does the conventional system of unsupported loops of slack film. In an apparatus built according to the present invention the advantages of the Bundick and Proctor system may be obtained for projecting silent pictures and the relatively inexpensive unit added to the machine embodying the tension control system, this unit including a sprocket which is continuously operated by the main mechanism. The advantages of this detachable unit are in no way limited, however, to use with the tension control system. For best results a sound head requires a continuously operating sprocket additional to the continuously operating sprocket of the conventional apparatus, such sprocket being placed between the sound head and the take up spindle in order to relieve the sound head of the effects of the pull of the take up spindle. If the main apparatus is furnished with the two conventional continuous sprockets the third or sound sprocket may be added by the detachable unit, thus supplementing the conventional apparatus. Since users of amateur apparatus often wish to transport their apparatus this feature of our invention is of particular value. The sound head amplifiers and the like are heavy and delicate and often the user would be glad to leave this heavy and delicate apparatus at home while still having the advantage of a silent projector. This feature of our invention is distinctly of commercial value in that it provides a more readily saleable article. The dealer finds it easier to sell a silent projector to which a sound head may later be attached by a subsequent purchase than to sell a silent projector to which a sound head cannot be later attached except by expensive rebuilding. With an apparatus manufactured according to our invention, the purchaser of a silent projector or the recipient of a silent projector as a gift may later go to the dealer and secure from him a sound head which he can add in a moment or two. The additional cost of the silent projector made necessary by the means for attaching the sound head represents a very small amount which adds a negligible amount to the price of the silent projector.

Another object of the invention is to improve upon the control mechanism shown in the co-pending application of Barton Allen Proctor, Serial Number 332,296 filed January 14, 1929, now Patent No. 1,944,035.

Apparatus built according to the present invention and according to the invention of the said Proctor to which reference has just been made is remarkably silent in operation. Such apparatus in fact is so free from the usual noises of a film projector that the skin friction of the film as it passes between the lightly pressed gate sections is clearly audible. Consequently the air rush of the ventilating fan proves objectionable. An object of the present invention is to supply a new type of cooling system which will operate with very much reduced noise. While such cooling system is particularly valuable in an otherwise silent projector such as that to which reference is above made it is also useful in any projecting apparatus. According to the present invention there is no air rush at all because the space in which the air moves is almost coextensive with the lamp house. The relatively slowly moving fan of a diameter almost as great as the width of the lamp house is placed at the bottom of the lamp house.

Another object is to secure improved arrangement of parts.

Another object is to secure improved control mechanism.

Other objects, advantages and characteristics are apparent from the following description, the attached drawings and the subjoined claims. Although we are showing but one embodiment of our invention for purposes of illustration, it will be readily understood that we are not limited to any particular construction as changes can readily be made without departing from the spirit of our invention or from the scope of our broader claims.

In carrying out the present invention, there may be provided an apparatus having a supporting base B upon which are mounted a main frame F, a lamp house support H, and a rear support R, these four elements preferably being in the form of aluminum castings. Adjusting screws not shown may be provided for the base B whereby the optical axis of the apparatus may be raised or lowered at will in order to place the picture upon the screen as desired. This construction may be of any desired form such as that shown in the co-pending application of Barton Allen Proctor, Serial Number 332,296, now Patent Number 1,944,035.

Mounted upon the lamp house support H is a spider 11 which may support a socket 12 for a projection lamp L. Suitable side plates 13 and a louvred top 14 complete the lamp housing. Channel members 15 may be used at the corners to strengthen the housing. It will be noted therefore that according to this preferred form one casting and sheet metal parts produce a rigid lamp housing with a minimum of weight and cost. As will best be seen by reference to Figure 1, the wall members 13 of the lamp housing are extended downwardly to form a skirt about the fan V. Angular members 16 at the bottom prevent the escape of light but leave a large opening through which the air is slowly drawn by the ventilating fan V. The main frame F is carried backwardly at the top thereof and may be bolted to the lamp housing, thus completing a simple and rigid framework for the entire apparatus.

Extending forwardly from the lamp housing is a cone 18 which prevents the escape of objectionable light. Mounted in the forward mouth of this cone is a heat shield 19, composed of heat resisting glass such as that constructed of colloidal gold, or a fine wire mesh. This screen may be mounted upon a shaft 20, this shaft being normally rotated toward the open position by a spiral spring 21 coiled thereabout.

All of the operating parts of the apparatus except a motor M and the fan may be positioned upon the main frame F and the rear support R. An objective lens 25 may be carried by a screw threaded holder 26, a screw 27 mounted upon the resilient member 28 attached to the housing 26 serving to prevent the accidental movement of the lens.

A delivery or rewind spindle 30 may be mounted as in a bearing 31 attached to the main frame F at the top thereof, and a bearing 32 mounted upon the rear support R. Any desired rewinding spindle clutch may be employed. The one which we show for purposes of illustration includes a pin 33 mounted in the shaft 30 for revolution therewith. Metallic plates 34 and 35 respectively with a felt or other friction disc 36 therebetween may form the means for frictionally driving this spindle, the member 34 being revoluble with the shaft 30 because of the location of the pin 33 in a slot in a shoulder thereof and the members 35 and 36 being revoluble upon the shafts independently thereof. A spring 37 serves to hold these members 34, 35 and 36 in close relation one to the other. Driving lugs 38 may be provided upon the disc 35. When power is applied through these lugs to the disc 35, it will be understood that the shaft 30 will be driven through the slip arrangement above described. For driving these lugs, pins 39 may be attached to a collar formed upon a sleeve 41 which revolves freely upon the shaft 30. Attached to or revoluble with this sleeve is a pulley 42 through which the driving pins 39 project through suitable openings. Pins 43 formed in a yoke 44 cooperate with an annular groove 45 likewise formed upon this sleeve. It will be understood that when movement is communicated to the yoke 44 as by a shaft 46, the revolution of the pulley 42 will be at once communicated to the spindle 30.

Suitably mounted in a bearing upon the frame F toward the bottom thereof is the take-up spindle 50 which is driven by a pulley 51 frictionally connected thereto through a unidirectional clutch device elsewhere described in connection with a backwardly projecting operation.

A main driving shaft 55 of the apparatus extends from a light front bearing 56 through the heavy central bearing 57' in the supporting frame F to a bearing 58 in the rear support R. Mounted upon the forward portion of this shaft are pull down teeth 57 which may be driven intermittently in any desired way, although we prefer for most purposes to use the mechanism described and claimed in the co-pending application of Barton Allen Proctor, Serial Number 705,546, filed January 6, 1934, now Patent No. 2,046,844, which is a division of the previously mentioned Proctor co-pending application. Since the particular arrangement of cams driven by the shaft 55 to impart intermittent motion to the teeth 57 forms no part of the present invention, they are not described herein. Also, if desired, positioning fingers may be used. This main operating shaft 55 is driven by means which will be best understood by reference to Figure 8 of the drawings.

Figures 7, 8:
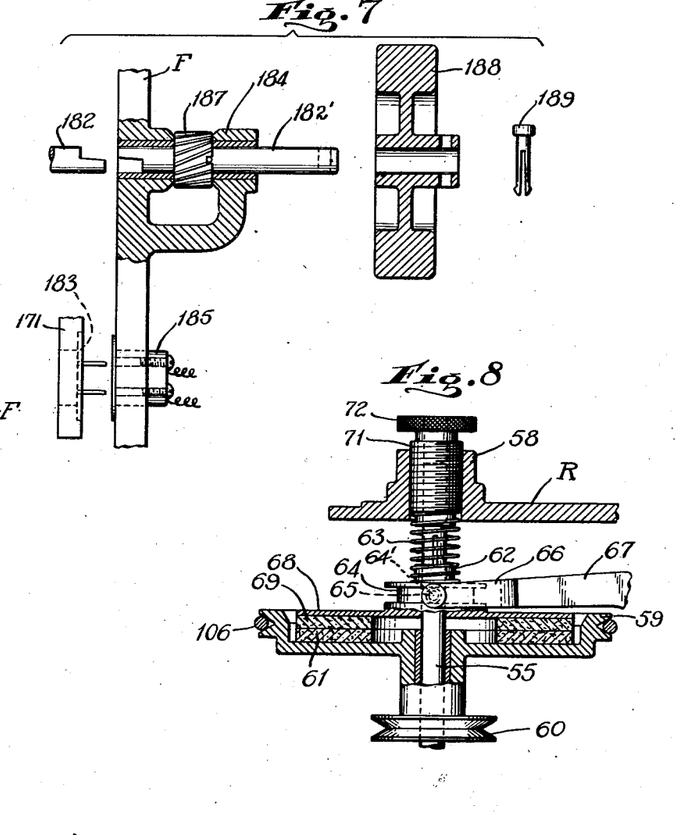
Figure 7 is an exploded sectional view corresponding in part to Figure 6.
Figure 8 is a detailed view, partly in section, of our main or driving clutch.

Mounted for revolution upon the shaft 55 is a unitary structure including the main driving pulley 59, the rewind driving pulley 60, and the shoulder joining the two. Friction material 61 is mounted for revolution with the pulley 59 in a cup shaped depression formed therein. To communicate the movement of this continuously revolving pulley to the shaft 55, a clutch member 62 is splined to the shaft and urged toward the pulley as by a spring 63 coiled about the shaft 55. Fastened to the clutch member 62 as by a pin 64', or formed integrally therewith is a shouldered member, with an annular depression 64 wherein clutch pins 65 joined to yoke members 66 formed upon a control arm 67 operate, may have formed integrally therewith circular plate 68 to the lower surface surface of which as viewed in Figure 8 is attached friction material 69 which cooperates with the friction material 61 to transmit the drive of the pulley 59 to the shaft 55 when the clutch member is moved downwardly as viewed in said figure. As will be seen from the drawings, this clutch assembly is unusually compact. To adjust the tension of the spring 63, a shouldered member 71 is threaded into bearing 58 and terminates in a knurled thumb screw 72. As will be readily apparent, when this thumb screw is turned in one direction, the tension upon the spring 63 will be increased and when it is turned in the other direction, such tension will be decreased, thus establishing the desired driving conditions between the motion-transmitting members just previously described.

In order to eliminate the necessity of providing for unsupported loops of slack film as has been common in the art in order to compensate for the differences of character in movement in the continuously rotating supply and take-up spindles and the intermittently operating feeding members there may preferably be employed the tension-control system of feeding certain features of which are disclosed and claimed in the co-pending application of Clarkson Ulysses Bundick and Barton Allen Proctor, Serial Number 44,482, filed July 18, 1925, now Patent Number 1,944,022.

The film passing from a carrier upon the supply or delivery spindle 30 to a carrier upon the take-up or feeding spindle 50 and through a gate which is later described preferably passes over the spring tension pads 73 and 74 carried respectively by the tension control arms 75 and 76, having respective pivotal mountings 77 and 78 upon the frame F, and being spring pressed toward the film as by the wire springs 79 and 80. If desired, braking means for the carriers DC and TC may be added to these tension arms as is described in the previously mentioned copending Proctor application or in the co-pending application of Bundick and Proctor.

Figure 1:
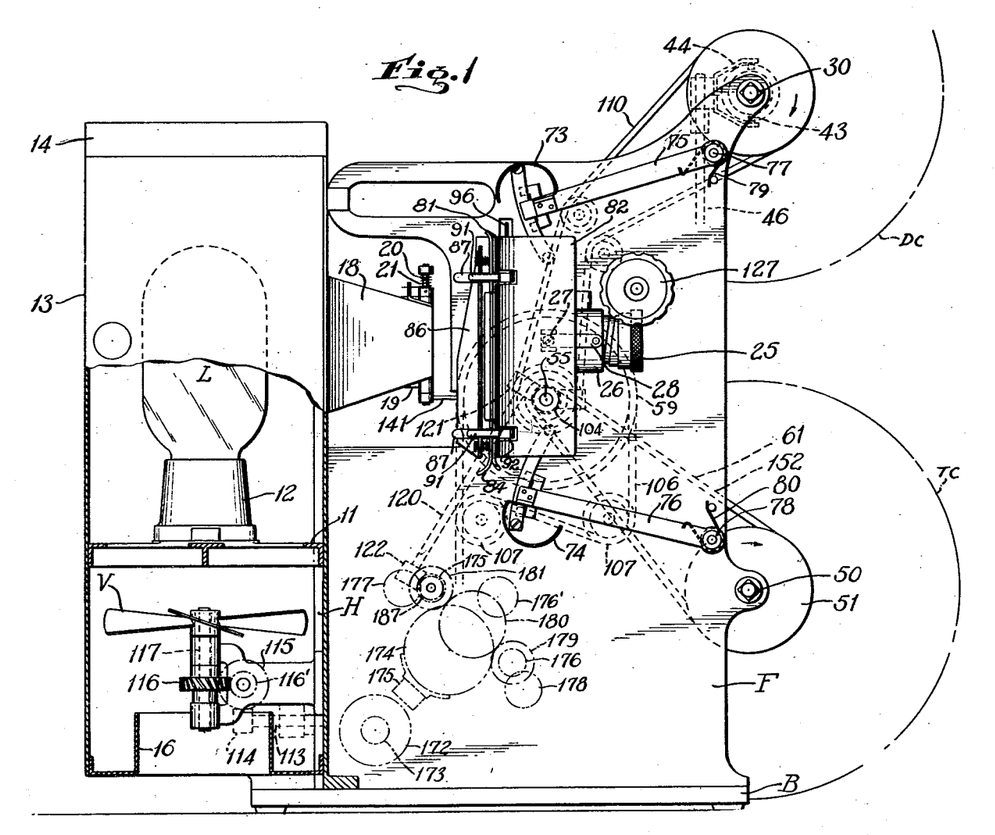
Figure 1 is a right side elevation, certain portions of the lamp housing being broken away, and certain details being omitted for clarity.

During the feeding cycle, as the film travels from the delivery spindle to the take-up spindle, each of which is revoluble in the direction indicated by the appropriate arrows in Figure 1, urged by the intermittent mechanism hereinbefore described, it is at once placed under a condition of tension. This causes the upper tension arm 75 through its pad 73 to be depressed as viewed in the drawings whereby the spring 79 is placed under a condition of increased tension. A portion of the pull so exerted upon the film is directly communicated to the mass of film carried by the delivery spindle 30, and a small portion of the film is drawn therefrom. As the film comes to rest in the gate hereinafter described in detail, the tension arm 75 urged by the power thus previously stored in the spring 79 moves upwardly and draws from the spindle an additional supply of film. Simultaneously with the conclusion of this upward movement, however, the intermittently operated moving element is again in action and the film is again pulled downwardly through the gate. The length of film required to compensate for that moved downwardly is drawn in part directly from the source of supply upon the spindle 30 and in part from the amount of film which has been fed forwardly by the previous upward movement of the tension arm 75. Since in the spindle 30 there is a certain resistance to rotation by reason both of inertia and friction, carrier DC thereupon is caused to move at intermittently varying rates of speed at different parts of each feeding cycle; but in actual practice, it has been found that under ordinary conditions of operation it never comes to a complete stop. The flat spring constituting the pad 73 also serves as a cushioning medium between the intermittent feeding mechanism and the film on the supply reel and as supplemental to the action of the spring 79.

Below the gate the corresponding tension arm 76 with its spring pad 74 in engagement with which the film travels operates in substantially the same fashion. As the film is pulled downwardly by the action of the intermittent feeding mechanism, the tension of the spring 80 operating through the arm 76 causes the spring pad 74 to remain in contact with the film and to keep it under tension. In the meantime, however, the rotation of the take-up spindles effected by mechanism herein described, tends to wind the film upon the yieldingly driven carrier upon the take-up spindle and to increase the tension of the spring 80 ready for the beginning of the next cycle of operation. Thus the tension of the film itself and of the spring 80 is opposed to the driving means for the spindle 50, the balance between the two in the invention herein disclosed being maintained primarily by and through the film. The flat spring constituting the pad 74 is supplemental to the action of the spring 80 and serves as a cushioning medium for the film.

From the foregoing, it will be apparent that from the beginning of the feeding movement the film is automatically placed under the desired condition of tension without any attention by the operator, and that this condition is automatically maintained during the operation of the apparatus.

Experience has demonstrated that the above method of feeding film whereby it is maintained under conditions of continuously controlled tension throughout the entire operative or unwound length of the film from the supply reel to the take-up reel and whereby the two reels are moved in certain timed relation of synchronism with the intermittent movement at the gate, effects a feeding of the film with considerably less wear to the perforations than is possible with the conventional method of feeding involving the use of continuously rotating feeding and taking up sprockets associated with unsupported loops of slack film. Although it is preferred to utilize a tension control as herein described, it will be understood that the utility of the invention is not limited with respect to the particular mechanism for effecting film feeding and that any desired form of sprockets, take-up mechanism, and the like, with their associated loops of slack film or any other desired mechanism, may be used if preferred.

Figure 2:
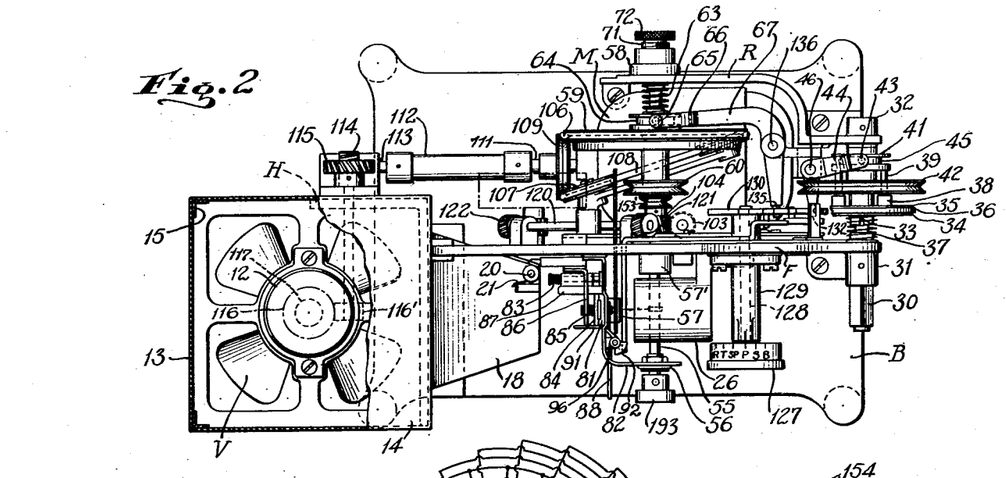
Figure 2 is a top plan view of the apparatus.

Any desired gate may be employed, the opening of which strips the film from the teeth of the feeding member, such as for example, the one shown and claimed in the copending application of the said Proctor, Serial Number 332,296, filed January 14, 1929, now Patent Number 1,944,035. For purposes of illustration herein, however, we show as a preferred form a gate such as that described and claimed in the co-pending application of the said Proctor, Serial Number 187,980, filed April 30, 1927, now Patent No. 1,944,033. It will be noted that in the first of the said Proctor gates the forward or stripping and protective gate member is positively moved by a connection with the control mechanism of the apparatus while in the second mentioned form, which is herein illustrated, this stripping or protective member or gate section 81 follows the movable gate member 84 when the latter is moved rearwardly for the purpose of opening the gate. Herein we show this front or protective and stripping gate member 81 mounted in a depression in an irregularly shaped film-guiding and structure-supporting plate or member 82 which extends from the frame F to the light bearing 56 for the forward end of the main operating shaft 55. This gate section is mounted for movement to the left as viewed in Figure 2 under the influence of a compression spring 83. Oppositely disposed to the gate section 81 is a gate section 84 resiliently mounted as upon a plurality of spring pressed headed pins 85 supported upon a movable bracket 86 which is attached to and moves with a gate control plate 145 (Figure 4) hereinafter described in detail, this gate section 82' being guided by pins 87. Upon the movement of the gate section 86 to the left or rearwardly as shown in Figure 2, the gate section 81 under the influence of the expansion of the spring 83 which has previously been compressed by a closing of the gate will follow the movement of the gate section 84 and be positioned between the ends of the teeth 57 and the film. As shown in the drawings, one or both of the gate sections may be relieved. A conventional framing device generally shown at 88 may be employed.

Positioning fingers to insure the movement of the film laterally into proper position within the gate may be provided as shown and claimed in the co-pending application of the said Proctor, Serial Number 348,633, filed March 20, 1929, now Patent No. 1,944,037. Such fingers 91 may be mounted for rotation with a rod 92 which is urged to closed position by a spring 93 as is clearly shown in Figure 4 of the drawings. A latch member 94 holds the fingers in the open or film threading position.

Cooperating with the aperture of the gate is a conventional shutter 96 mounted as upon a shaft 97 supported by an irregularly shaped bearing 98 which also serves as the support for a driving shaft 99 connected therewith by spiral gears 100 and 101. This shaft 99 in turn is driven by the spiral gears 103 attached thereto and 104 which is attached to the main operating shaft 55 for revolution therewith.

Power to drive the apparatus is supplied by the motor M mounted preferably by vibration damping means upon the base B. To communicate power from the motor to the intermittent pulley 59 a belt 106 may be used, this belt preferably passing over the tensioning and directing idlers 107 mounted upon the arm 108. It will thus be obvious that the feeding relation of the belt as it passes from a pulley 109 mounted upon the motor M to the main pulley 61 is always in proper relation to the members through which it drives. A 130, or with the uni-directional clutch shown in Figures 9 and 10. The take-up spindle driving pulley 51, which may be driven by a belt 152 from the pulley 153 fixed to the main driving shaft 55 is freely rotatable upon a bushing 154 about the shaft 50. Also mounted upon this bushing for free rotation is a member 155 including a friction plate 156 formed integrally therewith. Between this friction plate and the frame F a washer 157 is applied to hold a spring 158 in position, this spring forcing the friction plate 156 toward the pulley 51. Pinned to the shaft 50 upon the opposite side of the pulley 51 is a member likewise terminating in a metallic plate 157' attached to which is a friction plate 158'. Between this friction surface and the pulley 51 another friction plate 159 is applied freely rotatable upon the shaft 50. In appropriate openings in the pulley 51, balls 160 are placed the internal web of the pulley thus forming a ball cage. Opposite each of these openings a wedge shaped opening is formed in the plate 156. Thus it will be understood that while the pulley 51 is revolved in the direction shown by the arrow in Figure 9 the balls will be forced into the wide portion of the wedge and thus form operative connections between the pulley and the shaft 50 but when the shaft 50 is moved in a rewinding direction by the traction of the film upon the shaft 50 the balls will be permitted to move down the incline and thus destroy the connection between the shaft 50 and the pulley 51, thus making the shaft 50 an idling shaft.

Figure 5:
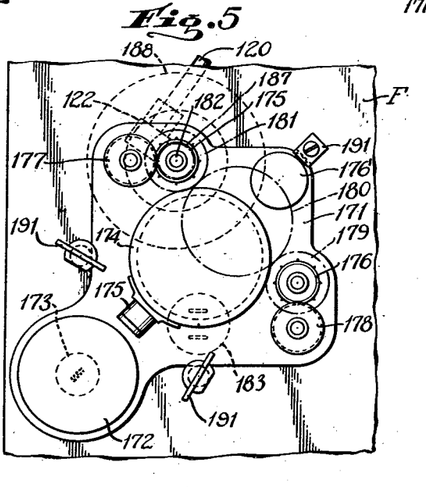
Figure 5 is a view largely diagrammatic, of our sound head showing the means for attaching it to the apparatus and removing it therefrom.
Figure 6:
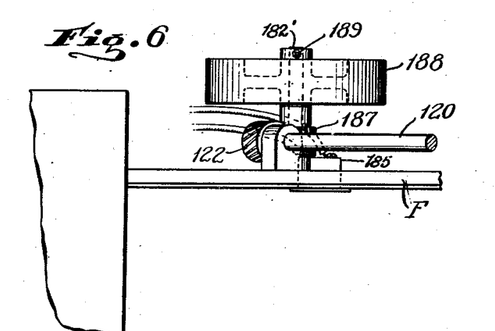
Figure 6 is an enlarged detailed view of preferred means for driving the sound head from the main apparatus.

Figure 5, for purposes of illustration only, shows a sound head which may be applied to the apparatus. It is to be understood that the sound head per se forms no part of the present invention and is being shown merely for the purpose of illustration. Any desired type of sound head may be used. The interconnection between the sound head and the driving and control portions of the film feeding apparatus, however, come well within the scope of our invention and are an important part thereof.

For such purposes of illustration we show a sound head mounted upon a plate 171, as clearly shown in Figure 5. Mounted upon this plate is a lamp housing 172 within which an exciter lamp 173 is placed. A slit-bearing member forming a sound gate 174 is mounted forwardly of the lamp housing and the lens element 175 directs light within this housing. In line with this optical element is photoelectric cell 176' shown as of the well-known small or "peanut" type. To move the film continuously in operative relation to the sound gate, continuously driven sprockets 175 and 176 are employed, furnished with idling rollers 177 and 178 respectively. The sprocket 176 may be driven by a gear 179 attached to the shaft thereof upon the rearward side of the plate, this gear in turn being driven by an idler 180 and the gear 181 which is attached to the shaft 182 of the sprocket 175. This shaft 182 extends to the rear of the plate 171 and as can clearly be seen in Figure 7 of the drawings terminates in an irregularly shaped formation having squared or right-angled motion-transmitting surfaces. Likewise extending to the rear of this plate is an electrical contact member 183. As the plate 171 carrying the sound head is placed in operative relation with the main frame F, the right-angled irregular surfaces upon the end of shaft 182 co-act with similar formations upon an end of shaft 182' which is mounted in bearings carried by the frame F and a bracket 184, these formations being adapted when the sound head is placed in operative relation with the apparatus to transmit the power of the motor M through shaft 182' to shaft 182 and sprocket 176, all as can readily be observed from the drawings. This shaft is driven by a spiral gear 187 which meshes with the previously described spiral gear 122 attached to the shaft 120 which is driven by the spiral gear 121 meshing with the gear 104 upon the main operating shaft 55. In order to apply a fly wheel effect to the sprockets 175 and 176, a detachable fly wheel 188 is employed, this fly wheel being adapted to be slipped over the end of the shaft 182' and pinned in place by a member 189. It will therefore be understood that the shaft 120 and the gear 122 run continuously during the operation of the apparatus. When the sound head is applied to the apparatus, its drive immediately engages with the drive of the apparatus and it may secure its power and, if desired, deliver its output in a conventional manner not shown as by use of connective instrumentalities such as those previously described in connection with the input through the electrical wiring system of the apparatus itself. The fly wheel 188, which is relatively heavy, may be applied and detached at will. To hold the sound head in place upon the frame F the holding members 191 may be employed.

By reason of the above construction it will be apparent that the sound head may be readily applied to and detached from the rest of the apparatus and that the mere act of attaching to the apparatus places it in operative relation with the driving and controlling portions thereof.

The sound head is shown in dot and dash lines, as applied to the apparatus, in Figure 1. It will be understood that if the user wishes to use the sound head, he will thread the film through it, disregarding the take-up tension member 74, but using the delivery member 73.

In order to provide a series of still pictures, if desired, the main operating shaft 55 has upon its forward portion a handle 193, shown as pinned to the shaft, but it will be readily understood that if desired a spring clutch may be applied between the handle and the rotating shaft, the handle being thrown out during forward operation.

The operation of the apparatus will be clear from the foregoing portion of this specification but may be summarized as follows:

With the control member in projection position P as shown, tne main operating clutch will be in power transmitting position whereby the intermittent feeding and taking up operations will be carried out, with the resistance in circuit with the motor cut to a point which, solely for purposes of illustration, we will designate as one-half. That is to say, the motor will be operating at a speed of say 960 revolutions per minute suitable for projection of motion pictures. The gate will be closed, the heat shield will be in the open position, transmitting the full light and the circuit to the exciter lamp 173 will be open.

When, however, the control member is moved forwardly to the sound position S, the exciter lamp will be rendered operative and the speed of the motor will be increased to one appropriate for sound pictures, say of 1440 revolutions per minute by the introduction of resistance which we call one-quarter, solely for illustration. Other operating conditions will be the same as for the projection of silent pictures.

When the control handle is moved still further forwardly to the backward projection position B, belt 110, passing over suitable idlers, drives the rewind pulley 42 from the pulley 60.

To drive the ventilating fan, the armature shaft 111 of the motor may be continued rearwardly preferably by means of the rubber coupling 112 to a stub shaft 113 which through the gears 114, 115, 116' and 116 drives the upright shaft 117 upon which the ventilating fan V is mounted. The ratio of these gears is such that the relatively large fan blades V move relatively very slowly thus passing a relatively large quantity of air at a relatively low speed through the lamp house. It will be appreciated therefore that noise will be entirely absent and that the ventilation of the apparatus will be accomplished so that there will be no interference with the sound being reproduced by the apparatus.

In order to drive the auxiliary detachable sound head later described in detail, a shaft 120 is provided driven by a spiral gear 121 meshing with the spiral gear 104 upon the main operating shaft 55. Attached to the rearward and lower end of this shaft is a spiral gear 122 which by means later described in detail serves to operate the sound head.

Figure 3:
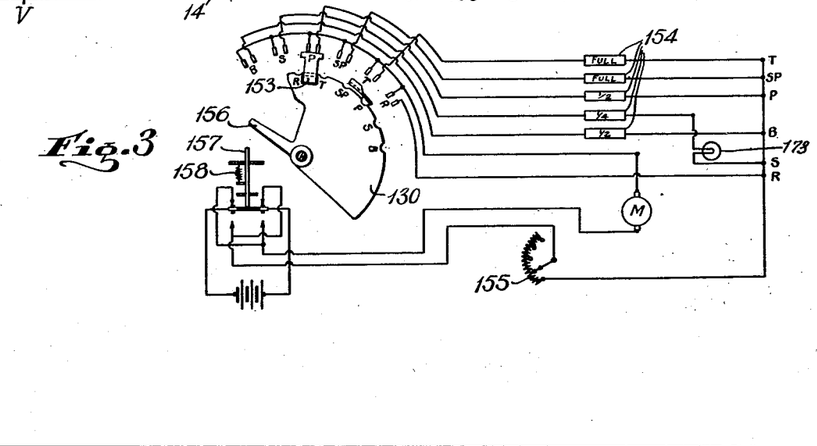
Figure 3 is a wiring diagram.
Figures 4, 9, 10:
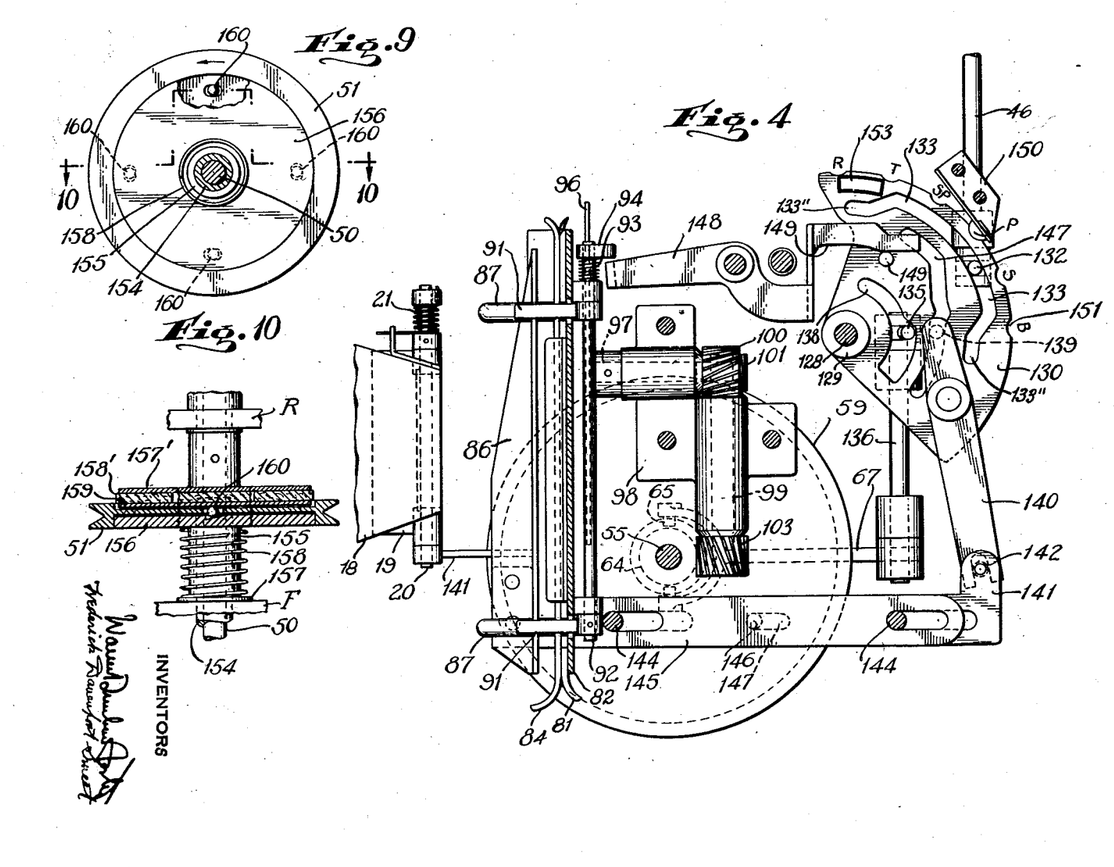
Figure 4 is an enlarged detailed view of our improved and simplified control mechanism certain members having been omitted in whole or in part for clarity.
Figure 9 is a detailed view of a unidirectional spindle drive.
Figure 10 is a view on the line 10—10 of Figure 9.

In order to actuate the above described apparatus both for the ordinary projecting operations and for the rearward projecting operation to which previous reference has been made, and to connect and disconnect the sound head and to control as desired the speed of the motor, the mechanism shown in detail in Figures 3 and 4 may be employed.

Conveniently projecting forwardly is the control knob 127 mounted as upon a shaft 128 which operates within the bearing member. The knob 127 carries indicia such as the letters R, T, SP, P, S and B, indicating respectively "Rewind," "Threading," "Still-picture," "Projection," "Sound," and "Backward-projection." It will be understood, therefore, that when the knob is turned so that the arrow points to the appropriate letter, the apparatus will perform in the manner indicated.

Attached to the shaft 128 and movable with it is a single control cam plate 130, the movement of which operates the entire apparatus in the manner desired. Such an arrangement is an obvious improvement over previous control mechanism, in view of its extreme simplicity. Since the drawings show the apparatus in the ordinary projecting position, this control mechanism will be described accordingly.

It will be understood that in this projecting position the rewind spindle 30 will be disconnected from its source of power, the take-up spindle 50 and the intermittent fingers 57 in operation in a feeding direction, the gate closed, the positioning fingers 91 in a closed or locking position, and the speed of the motor adjusted for projection in motion. The previously described rewinding spindle clutch is operated by a shaft 46 to which the yoke 44 is attached. A pin 132 operating in a cam slot 133 cut in the control disc 130 operates the shaft 46. It will thus be understood that the portion of the movement of the cam plate 130 during which the central portion 133' of the cam slot 133 is equidistant from its center of rotation will hold the rewind spindle clutch in the inoperative position and its movement which brings the terminal offset portions 133'' of slot 133 into coaction with pin 132 will be effective for thrusting the power transmitting fingers 39 into engagement with the driven lugs 38 thereby revolving the rewinding spindle 30 in a rewinding direction. The main clutch may be operated by a pin 135 mounted in the shaft 136 which through the arm 67 controls the previously described yoke 66 which renders the main clutch successively operative and inoperative in accordance with the contour thereof. Appropriate movement is given to the movable gate section 82 and to the heat shield 19 by means of a pin 139 attached to an arm 140 which moves a long and irregularly shaped control plate 141 through a pin 142. This plate 141 extends backwardly to form contact with a square formation upon the shaft 20, which it rotates to close the heat shield against the power of the spring 21. Mounted upon this plate 141 and guided by pins 144 is the gate operating plate 145 which at its rearward end is attached to the bracket 86 which supports the movable gate section 82. Movement is imparted to the gate control plate 145 by the pin 146 which is attached to the gate control plate and operated by a slot 147 in the heat shield control plate 141. The previously described latch 94, which holds the positioning fingers 91 in open or threading position, may be released by an irregularly shaped control plate 148 which is operated by a pin 149 working against a cam surface 149' as clearly shown in Figure 4.

To hold the control disc 130 in any of the positions to which it is moved, a detent member 150 cooperating with the notches 151 may be supplied. The stations to which each such notch corresponds have been noted upon Figure 4. It will thus be evident that the movement of the one control disc controls all of the ordinary projecting rewinding, threading, and still picture operations, in addition to the ones later to be described.

In order to control the motor circuit in the manner previously set forth, a switching or contact forming member 153 is mounted upon the control plate 130. As will be clearly understood by reference to Figure 3, this switching member 153 bridges the various contacts clearly shown therein and closes or opens the circuits to the various resistances indicated generically and diagrammatically as 154. For purposes of illustration only, these resistances are marked in Figure 3 to indicate relative degrees of resistance which may be employed. It will thus be understood that when the control disc is moved between its respective positions, the various indicated circuits will be closed, thus placing the various indicated degrees of resistance in the circuit of the motor M. If it is also desired to control the speed of operation of the apparatus by the will of the operator, conventional variable resistance 155 may be provided.

In order to accomplish the previously stated purpose of projecting a picture backwardly in motion, a reversing switch such as that shown diagrammatically in Figure 3 may be employed. An extension 156 of the control disc 130 serves to move the plunger 157 against the influence of the spring 158, thus as is clearly and diagrammatically indicated, changing the poles of the motor and consequently its direction of rotation.

While the motor is reversed by means of the reversing switch just described and the entire apparatus is running backwardly, it is necessary either to declutch the taking up spindle 50, as may be done by a clutch mechanism such as that described in the co-pending application of Barton Allen Proctor, Serial Number 332,296, filed January 29, 1929, now Patent Number 1,944,035, and controlled by an appropriate cam slot in the plate the speed of the motor will be reduced to one appropriate for ordinary projection, the motor and drive will be reversed, and the rewind spindle will become operative. Thereupon pictures will be projected backwardly and intermittently through the closed gate, with the full light upon the film.

It will be understood that if the user wishes to proceed from ordinary silent projection to backward projection, he will pass quickly through the sound position, the temporary speeding up of the motor being unobjectionable.

When the control handle is moved backwardly to the still picture position SP, full resistance will be placed in the circuit of the motor and the intermittent and taking up means will be rendered inoperative, the projection light shield moving to shielding position, and the circuit of the exciter lamp maintained open.

When the control member is moved further backwardly to the threading position T, the gate will be opened, thereby protecting the film from the teeth of the intermittent feeding member, full resistance will be in the circuit with the light source, and all moving members will be inoperative, the exciter lamp remaining inoperative.

When the control member is moved to the normal winding position R, the film will be free to move continuously through the gate, the locking member 94 being effective, all resistance will be removed from the circuit of the motor, thereby giving it full speed, and the heat of the light source will still be reduced.

Owing to the frictional drive of the rewinding spindle, if the user should inadvertently turn the handle 127 to the rewinding position with the film threaded in the sound head, no damage will be done. The film will remain motionless. If automatic high speed rewinding through a sound head is desired, use may be made of the invention described and claimed in our co-pending application, Serial Number 653,140 filed January 23, 1933, now Patent No. 2,051,036. Automatically rewinding through the sound head and intermittent is easily accomplished however, by this structure.

It will be understood that except in the sound position S the circuit of the exciter lamp is maintained open. It will also be understood that the reverse movement of the control member is analogous to that just described except that the positioning fingers 91 are snapped to operating position immediately upon the movement of the control member from the threading position T toward the still picture position S P. They may be opened by hand or by means described in the co-pending application of the applicant Foster, Serial Number 335,832 filed January 29, 1929, now Patent Number 1,943,304.

The advantages of our invention will be evident from the foregoing specifications, the accompanying drawings and the sub-joined claims. These advantages include the provision of a sound unit which may be bodily detached from the film handling apparatus and driven and controlled thereby, said film apparatus and/or said sound head being completely controlled in all its operations by an improved and efficient unitary control mechanism. Other advantages include the provision of highly efficient and silent ventilating means.

We claim:

1. In a film handling apparatus, a delivery carrier, a take-up carrier, film-contacting guiding means for establishing a path of travel through said apparatus between said delivery carrier and said take-up carrier, means for intermittently feeding a film through said path of travel from said delivery carrier toward said take-up carrier and driving said take-up carrier in a projecting direction for projecting pictures in motion, means for intermittently feeding said film through said path of travel from said take-up carrier toward said delivery carrier and driving said delivery carrier in a rewinding direction for projecting pictures in motion but backwardly, means for continuously feeding said film through said path of travel from said take-up carrier toward said delivery carrier and driving said delivery carrier in a rewinding direction as for the purpose of preparing for a subsequent re-showing of the film, said last previously recited rewinding means including an instrumentality for rendering said intermittent feeding means inoperative upon the film in said path as it is being fed therethrough in said continuous rewinding operation, and means operatively connected with both of said carriers for releasing one of said carriers from the driving means therefor, when said other carrier is being driven, whereby a film may be projected forwardly or projected backwardly or rewound without the necessity of detaching it from either of said carriers or of removing it from said path of travel established by said film-contacting guiding means or rethreading it in said path.

2. In a film handling apparatus, a delivery carrier and a take-up carrier, film-contacting guiding means establishing a feeding path for a film through said apparatus between said delivery carrier and said take-up carrier, means for intermittently moving a film through said path from said delivery carrier toward said take-up carrier and driving said take-up carrier in a projecting direction for projecting pictures in motion therefrom, controllable means for intermittently moving the film through said path and driving said delivery carrier in a rewinding direction for projecting pictures in motion but backwardly, controllable means for continuously moving the film through said path from said take-up carrier toward said delivery carrier and driving said delivery carrier in a rewinding direction as in preparation for a subsequent re-showing of the film without the necessity of detaching it from either of said carriers or of removing it from said path of travel or of rethreading it therein, said last mentioned rewinding means including an instrumentality for rendering said intermittent moving means inoperative upon the film in said path while it is being rewound therethrough, and control means including an actuating member and operative interconnections between said actuating member and said two controllable rewinding means for alternatively and selectively operating each of the same for moving the film through said path.

3. In a film handling apparatus, a delivery carrier and a take-up carrier, film-contacting guiding means establishing a path of travel for a film through said apparatus between said delivery carrier and said take-up carrier, means for intermittently feeding said film through said path of travel from said delivery carrier toward said take-up carrier and driving said take-up carrier in a feeding direction for projecting pictures in motion therefrom, means for intermittently feeding said film through said path of travel from said take-up carrier toward said delivery carrier and driving said delivery carrier in a rewinding direction for projecting pictures in motion but backwardly, means for continuously moving the film through said path of travel from said take-up carrier toward said delivery carrier and driving said delivery carrier in a rewinding direction as for the purpose of preparing for a subsequent re-showing of the film without the removal of the film from said path or of detaching it from either of said carriers, said last mentioned rewinding means including an instrumentality for rendering said intermittent feeding means inoperative upon the film in said path while it is being rewound therethrough, a motor for driving both of said rewinding means, resistance connectible in the circuit of said motor, and means operatively interconnected with said continuous rewinding means and said intermittent rewinding means and said resistance and containing instrumentalities for necessarily placing said resistance in said circuit during the operation of said intermittent rewinding means and removing it therefrom during the operation of said continuous rewinding means whereby said continuous rewinding is carried out at a speed relatively higher than that of said intermittent rewinding.

4. In a film handling apparatus, a delivery carrier and a take-up carrier, film-contacting guiding means establishing a path of travel through said apparatus between said carriers, controllable means for intermittently feeding a film through said path of travel from said delivery carrier toward said take-up carrier and driving said take-up carrier in a projecting direction for projecting pictures in motion, controllable means for intermittently feeding said film through said path of travel from said take-up carrier toward said delivery carrier and driving said delivery carrier in a rewinding direction for projecting pictures in motion but backwardly, controllable means for continuously feeding said film through said path of travel from said take-up carrier toward said delivery carrier and driving said delivery carrier in a rewinding direction as for the purpose of preparing for a subsequent re-showing of the film, said last mentioned rewinding means including an instrumentality for rendering said intermittent feeding means inoperative upon the film in said path while it is being continuously rewound therethrough, whereby motion pictures may be projected or motion pictures projected backwardly or the film rewound as for a subsequent re-showing without removal from said path or being detached from either of said carriers or without being re-attached to either thereof, and control mechanism, said control mechanism including a single operable control member, and operating connections between said control member and each of said controllable feeding means for selectively rendering operative any of said feeding means by predetermined operation of said single member.

5. In a film handling apparatus, a delivery carrier and a take-up carrier, means establishing a path of travel through said apparatus between said carriers, controllable means for intermittently feeding a film through said path of travel from said delivery carrier toward said take-up carrier and driving said take-up carrier in a projecting direction for projecting pictures in motion, controllable means for intermittently feeding the film through said path of travel from said take-up carrier toward said delivery carrier and driving said delivery carrier in a rewinding direction for projecting pictures in motion but backwardly, controllable means for continuously feeding said film through said path of travel from said take-up carrier toward said delivery carrier and driving said delivery carrier in a rewinding direction as for the purpose of preparing for a subsequent re-showing of the film, said last mentioned rewinding means including an instrumentality for rendering said intermittent feeding means inoperative upon the film in said path while it is being continuously rewound therethrough, and control mechanism, said control mechanism including a single operable and movable control member, operative connections between said control member and each of said feeding means for selectively rendering operative any of said feeding means by predetermined operation of said single member, a pivotal mounting for said control member, and a plurality of formations upon said control member each of which engages one of said connections associated with one of said feeding means and operates it whereby the movement of said single control member enables the operator selectively to project pictures in normal motion or pictures in backward motion or to rewind a film for example ready for subsequent re-showing without removing the film from said path or detaching it from either carrier or re-attaching it thereto.

6. In a film handling apparatus, film-contacting guiding means establishing a path of travel therethrough, means including a film engaging member for intermittently feeding a film through said path of travel in a projecting direction for projecting pictures in motion, controllable means for intermittently feeding said film through said path of travel in a rewinding direction for projecting pictures in motion but backwardly, a first actuating means for controlling said intermittently rewinding feeding means, controllable means for continuously feeding said film through said path of travel in a rewinding direction as in preparation for a subsequent projecting operation, a second actuating means for controlling said intermittently rewinding means, controllable means for freeing the film from interference by said intermittent film engaging member during said continuous rewinding operation through said path of travel whereby said rewinding operation may be quickly carried out without hindrance by said film engaging member, an actuating member for controlling said film-freeing means, an operating connection between said actuating member for said film-freeing means and said second actuating means for rendering said film-freeing means operative upon the film in said path upon the actuation of said continuous rewinding means, and an operating connection between said actuating member for said film-freeing means and said first actuating means for rendering said film freeing means inoperative upon the film upon the actuation of said intermittent rewinding feeding means.

7. In a film handling apparatus, a first and a second continuously operable support for a film, guiding means establishing a path of travel from one of said supports toward the other thereof through said apparatus, means for intermittently feeding a film through said path of travel from the first of said supports toward the second thereof and for continuously driving said second support in a projecting direction for projection pictures in motion, means for intermittently feeding said film through said path of travel from the second of said supports toward the first thereof and for continuously driving said first support in a rewinding direction for projecting pictures in motion but backwardly, means for continuously feeding said film through said path of travel from the second of said supports toward the first thereof and driving said first support in a rewinding direction as for the purpose of preparing for a subsequent re-showing of the film, said last mentioned rewinding means including an instrumentality for rendering said intermittent feeding means inoperative upon the film in said path while it is being continuously rewound therethrough, and means including a member engaging the film at the conclusion of said continuous rewinding operation and during such subsequent reshowing of the film and necessarily rendered effective by the subsequent restarting of said intermittent projecting operation for compensating for the difference in the character of movement of said intermittent feeding means and said continuously operating supports during such subsequent re-showing.

8. In a film handling apparatus, a delivery carrier and a take-up carrier, guiding means establishing a path of travel for a film between said carriers, means including a member engaging the film for intermittently feeding the film through said path of travel from said delivery carrier toward said take-up carrier and driving said take-up carrier in a feeding direction for projecting pictures in motion, controllable means for intermittently feeding said film through said path of travel from said take-up carrier toward said delivery carrier and driving said delivery carrier in a rewinding direction for projecting pictures in motion but backwardly, controllable means for continuously moving the film through said path of travel from said take-up carrier toward said delivery carrier and driving said delivery carrier in a rewinding direction as for the purpose of preparing for a subsequent re-showing of the film, controllable means for freeing the film from interference from said film engaging member during such continuous rewinding operation, means for actuating said film-freeing means, a motor for driving both of said rewinding means, resistance connectible in the circuit of said motor, actuating means for connecting said resistance in the circuit of said motor, and control mechanism, said control mechanism including means operatively interconnected with said continuous rewinding means said intermittent rewinding means said actuating means for actuating said resistance and said means for actuating said film-freeing means and including devices necessarily effective during the operation of said intermittent rewinding means for placing said resistance in said circuit of said motor and for rendering said film-freeing means inoperative and means necessarily effective during the operation of said continuous rewinding means for removing said resistance from said motor circuit and for actuating said film-freeing means whereby said continuous rewinding is carried out at a speed relatively higher than that of said intermittent rewinding and without intereference by said film engaging member.

9. In a film handling apparatus, a first and a second continuous operable support for a film, guiding means establishing a path of travel for a film through said apparatus between said supports, means for intermittently feeding a film through said path of travel from said first toward said second support and for continuously driving said second support in a projecting direction for projecting pictures in motion, means for intermittently feeding said film through said path of travel from said second toward said first support and for continuously driving said first support in a rewinding direction for projecting pictures in motion but backwardly, means for continuously feeding said film through said path of travel from said second toward said first support and driving said first support in a rewinding direction as for the purpose of preparing for a subsequent reshowing of the film, said last mentioned rewinding means including an instrumentality for rendering said intermittent feeding means inoperative upon the film in said path while it is being continuously rewound therethrough, and means including a member engaging the film along said path of travel adjacent said intermittent feeding means and necessarily effective upon the film after the operation of said continuous rewinding means and before the operation of either of said intermittent feeding means for compensating for the difference in character of movement of said intermittent feeding means and said continuous supporting means.

10. In a film handling apparatus, a gate comprising a fixed section and a section movable relatively thereto between a first position wherein said sections are separated so that a film may be threaded therein and a second position wherein said sections are disposed in close relation so that a film is held in position to be fed, means for moving said sections between said first and second positions, means for feeding a film between the sections of said gate when in said second position, a motor for driving said feeding means, resistance connectible in the circuit of said motor, means for connecting said resistance in said circuit, control mechanism operatively interconnecting said resistance connecting means and said means for moving said gate section for concomitantly moving said movable section to said first position and operating said resistance connecting means, and means for maintaining said resistance connected in said circuit after said gate section has been so moved so that the speed of said motor is reduced as during a threading operation.

11. In a film handling apparatus, means for feeding a film through said apparatus, revoluble means for supporting the film after it has been fed therethrough, a lamp for directing light upon the film, a fan for reducing the heat from said lamp, a motor, a connection between said motor and said fan for operating said fan by said motor, a releasable connection between said motor and said film feeding and supporting means, a first control means for maintaining the power of said motor at a given minimum level sufficient to drive said film feeding and supporting means and move the film so that it does not come to rest in the path of said light, a second control means for operating said motor at a power level less than said predetermined minimum when said releasable connection is released thereby operating said fan for reducing the heat from said light source without the noise and vibration which follows the racing of said motor without the load of said feeding and supporting means, and control mechanism operatively interconnecting said releasable connection and said first and second power maintaining means and including devices for necessarily rendering said first power maintaining means effective when said releasable connection is not released, and for necessarily maintaining said second power control means operative when said releasable connection is released.

12. In a film handling apparatus, a plurality of operable parts for moving a film through said apparatus, a motor for driving said parts, a first means for operating said motor at a given level of power insufficient to drive said film moving parts, a second means for operating said motor at another and a higher given level of power sufficient to drive said film moving parts, a releasable connection between said motor and said film moving parts, and control mechanism operatively interconnecting said releasable connection and said first and second operating means and including devices which necessarily render said first or low power operating means effective during the period during which said releasable connection is released and said second or high power operating means effective during the period during which said releasable connection is operative whereby said motor necessarily receives sufficient power to drive said parts while it is connected thereto although its power is necessarily reduced when disconnected therefrom.

13. In an apparatus alternatively operative for handling sound and silent films, film guiding members forming a path in said apparatus for a film, a sound head disposed along said path, said sound head including an exciter lamp, a light-responsive element upon which light from said light falls, and means for preventing light from said lamp falling upon said element thereby rendering said sound head inoperative to reproduce sound from the film, an apertured gate for the picture disposed along said path, means for feeding the film along said path through said sound head and past the aperture of said gate, a motor for driving said feeding means, two circuits in which said motor may be alternatively placed, one of said circuits containing a predetermined amount of resistance such that the motor drives said feeding means at a speed suitable to a sound-film and the other of said circuits containing a predetermined amount of resistance different from said first mentioned amount of resistance and such that the motor drives such feeding means at a speed suitable for a silent film, switching means for alternatively placing said motor in either of said circuits, and control mechanism operatively interconnecting said switching means and said means for preventing light from said exciter lamp from falling upon the film for concomitantly operating both thereof whereby the speed of the motor is automatically set in accordance with the operativeness and inoperativeness of said sound head.

14. In combination, a film handling apparatus and a sound head; said sound head having a supporting member and film feeding means mounted thereupon; said film handling apparatus having mounted thereupon means for feeding the film which is fed by said sound head, mechanism for driving both said film feeding means which is mounted thereupon and also for driving said film feeding means which is mounted upon said sound head, guiding surfaces formed upon said sound head and upon said film handling apparatus, an operating connection between said driving mechanism and said film feeding means of said sound head, said operating connection including a driving member mounted upon said apparatus and a driven member mounted upon said sound head, said members having cooperatingly formed surfaces so that when they are brought into contact they transmit the power of said driving mechanism of said apparatus to the film feeding means of said sound head, and means formed upon said apparatus for receiving said supporting member, said last previously mentioned means, said supporting member, said driving and driven members and said guiding surfaces being so formed and disposed that the act of placing said sound head upon said apparatus places it in full operative relation thereto.

15. In combination, film feeding apparatus, a sound head, and means for detachably mounting said sound head upon said film feeding apparatus; said film feeding apparatus having operable parts and means for selectively controlling the operation of said parts; and said sound head having operable parts; and said mounting means having cooperatingly disposed guiding surfaces some disposed upon said sound head and some disposed upon said apparatus and including devices for operatively interconnecting said control means of said film handling apparatus with the operable parts of said sound head, said guiding surfaces being so disposed that the act of mounting said sound head upon said apparatus places the operable parts of said sound head under the control of said selective control means of said apparatus so that the operable parts of said sound head thereupon without further manipulation can be operated conjointly with the operation of the operable parts of said film feeding apparatus under the control of the control means of said film feeding apparatus.

16. In an apparatus which is adapted for alternatively handling sound and silent films, a delivery carrier and a take-up carrier, guiding surfaces establishing a path in said apparatus between said carriers through which a film may be fed, mechanism for feeding the film through said path, mechanism for operating said feeding mechanism in a projecting direction for advancing a film from said delivery carrier toward said take-up carrier, control mechanism governing the speed of operation of said operating mechanism, said speed governing mechanism including a first device which is operable for establishing a predetermined speed which is suitable for the projection of a silent film and a second and alternative device which is operable for establishing a predetermined speed which is greater than said first mentioned speed and is suitable for the projection of a sound film, a sound head associated with said path, means for rendering said sound head operable upon a film which is being fed through said path, means for rendering said sound head inoperable upon said film, means for driving said projecting mechanism in a rewinding direction for moving said film from said take-up carrier toward said delivery carrier, means for rendering said projecting mechanism inoperative, and control mechanism operatively interconnecting all of said means and said first and second devices for selectively and predeterminedly operating each thereof.

17. In an apparatus for alternatively handling silent and sound motion picture films, guiding members forming a path through which a film of either type may be alternatively fed, mechanism for feeding a film through said path, means for operating said mechanism in a projection direction for feeding a silent film through said path at a predetermined speed suitable for silent motion pictures, alternative means for operating said mechanism in a projecting direction for feeding a sound film through said path at a predetermined speed suitable for sound motion pictures greater than said first mentioned speed, a sound head, means for rendering said sound head alternatively operable and inoperable upon a film which is being fed through said path, means for rendering said projecting mechanism inoperative upon a film in said path, and control mechanism operatively interconnecting all of said means for selectively and predeterminedly operating each thereof.

18. In an apparatus which is adapted for alternatively handling sound and silent films, guiding surfaces establishing a path in said apparatus through which a film may be fed, mechanism for feeding the film through said path, mechanism for operating said feeding mechanism in a projecting direction, control mechanism governing the speed of operation of said operating mechanism, said speed governing mechanism including a first device which is operable for establishing a predetermined speed which is suitable for the projection of a silent film and a second and alternative device which is operable for establishing a predetermined speed which is greater than said first mentioned speed and is suitable for the projection of a sound film, a sound head associated with said path, means for rendering said sound head inoperable upon a film which is being fed through said path, means for rendering said projecting mechanism inoperative, and control mechanism operatively interconnecting all of said means and said first and second devices and including movable actuating mechanism which when moved to a first position operates said first speed-establishing device and renders inoperative said device for rendering said projecting mechanism inoperative and operates said means for rendering said sound head inoperable thereby projecting a silent motion picture at a speed proper thereto and when moved to a second position operates said second speed-establishing device and renders inoperative said device for rendering said projecting mechanism inoperative and renders inoperative said means for rendering said sound head inoperable thereby projecting a sound motion picture at a speed proper thereto and when moved to a third position operates said means for rendering said projecting mechanism inoperative and operates said means for rendering said sound head inoperable thereby silently projecting a still picture.

19. In an apparatus for alternatively handling silent and sound motion picture films, guiding members forming a path through which a film of either type may be alternatively fed, mechanism for alternatively feeding a film of either type through said path, means for operating said mechanism in a projection direction for feeding a silent film through said path at a predetermined speed suitable for silent motion pictures, alternative means for operating said mechanism in a projecting direction for feeding a sound film through said path at a predetermined speed suitable for sound motion pictures greater than said first mentioned speed, a sound head, means for rendering said sound head alternatively operable and inoperable upon a film which is being fed through said path, and control mechanism operatively interconnecting all of said means for selectively and predeterminedly operating each thereof.

20. In an apparatus which is adapted for alternatively handling sound and silent films, guiding surfaces establishing a path in said apparatus through which a film may be fed, mechanism for feeding a film of either type through said path, mechanism for operating said feeding mechanism in a projecting direction, control mechanism governing the speed of operation of said operating mechanism, said speed governing mechanism including a first device for establishing and maintaining a predetermined speed which is suitable for the projection of a silent film and a second and alternative device for establishing and maintaining a predetermined speed which is different from said first mentioned speed and is suitable for the projection of a sound film, a sound head associated with said path, means for rendering said sound head alternatively operable and inoperable upon a film which is being fed through said path, and control mechanism operatively interconnecting said means for rendering said sound head alternatively operable and inoperable and said first and second speed determining devices for selectively and predeterminedly operating each thereof.

21. In an apparatus adapted for alternatively handling silent and sound motion picture films, guiding surfaces establishing a path of travel for a film of either type through said apparatus, means for feeding a film of either type through said path, mechanism for operating said feeding means, mechanism governing the speed of operation of said feeding means, said speed governing mechanism including a first device which is operable for establishing a predetermined speed which is suitable for the projection of a silent film and a second and alternatively operable device which is operable for establishing a predetermined speed which is markedly different from said first mentioned speed and is suitable for the projection of a sound film, a sound head associated with said path, means for disabling said sound head, and control mechanism operatively interconnecting said first and second speed determining devices and said disabling means and including instrumentalities which necessarily maintain said disabling means operative except during the period during which said second speed determining device is effective whereby said sound head is maintained inoperative except during the period during which the film is being fed at a speed suitable for the presentation of a sound motion picture film.

22. In an apparatus adapted for alternatively handling silent and sound motion pictures divided into frames, a delivery carrier and a take-up carrier, guiding members forming a path for a film between said carriers in said apparatus, film engaging members for feeding a film through said path from one of said carriers to the other thereof, means for operating said feeding members in a projecting direction for advancing the film from said delivery carrier toward said take-up carrier through said path, means for maintaining said members in operation in a projecting direction at a predetermined speed of the order of sixteen frames per second suitable for a silent film, mechanism for reproducing sound from a film while it is being fed through said path from said delivery carrier toward said take-up carrier by said film engaging members, means for rendering said sound-reproducing mechanism alternatively operative and inoperative, means for maintaining said feeding members in operation in a projecting direction for advancing a sound film from said delivery carrier toward said take-up carrier at a predetermined speed of the order of twenty-four frames per second suitable for a sound film, means for rewinding a film through said path from said take-up carrier toward said delivery carrier, and control mechanism operatively interconnecting all of said means and including devices for necessarily maintaining said sound reproducing mechanism inoperative except when a film is being fed forwardly in a projecting direction through said path at a speed of the order of twenty-four frames per second.

23. In a film handling apparatus, means establishing a path of travel for a film therethrough means for feeding the film intermittently through said path of travel in a forward direction, means for feeding the film intermittently through said path of travel in a backward direction, a motor, means operable for alternatively connecting said motor and either of said film feeding means, a plurality of resistances connectible in the circuit of said motor, one at a time, in accordance with the direction of movement of the film, each of said resistances having a current reducing effect different from the current reducing effect of other of said resistances, a sound head, means for releasably mounting said sound head on said apparatus, means carried by said mounting means operable for feeding the film continuously past said sound head, means operable upon the mounting of said sound head upon said apparatus for drivingly connecting said motor and said last named feeding means, a master control mechanism for selectively operating said connecting means for feeding the film in either direction, said control mechanism including means for selectively connecting that one of said resistances in the circuit of said motor which is suitable for the direction of film movement.

24. In combination, a film handling apparatus and a detachable sound head for use therewith whereby said apparatus may be selectively used for silent and sound films, said film handling apparatus and said sound head each having film feeding means and said film handling apparatus having driving mechanism for both of said film feeding means, said film feeding means of said detachable sound head being compact and relatively light, means made operative by the mounting of said sound head upon said film handling apparatus for drivingly connecting said film feeding means of said sound head and said driving mechanism of said film handling apparatus whereby said driving means of said apparatus drives said sound head, means for latching said sound head in assembled relation to said apparatus and readily detaching it therefrom, weighted damping means attachable to said driving mechanism of said film handling apparatus so that when said sound head is assembled therewith said damping means may be effective, and detachable therefrom when said sound head is removed and said driving mechanism freed from the burden thereof when silent films are to be shown, and means for latching said damping member in such assembled relation and unlatching it therefrom.

25. In combination, a film handling apparatus and a sound head, said film handling apparatus including operable parts some of which include electrical control circuits and said sound head including operable parts some of which include electrical control circuits, means for detachably mounting said sound head upon said film handling apparatus, a master electrical control mechanism mounted upon said apparatus and including circuits, connections between some of said circuits and the control circuits of said operable parts of said apparatus, a movable actuating member for all of said circuits of said master control mechanism mounted upon said apparatus, and means automatically effective upon the mounting of said sound head upon said apparatus for connecting the circuits of said sound head with those of said master control mechanism which are not connected to those of the operable parts of said apparatus whereby the movement of said actuating member controls all of said operable parts of said sound head and said apparatus when the two are in assembled relation.

26. In combination, a sound head and a film handling apparatus, said film handling apparatus and said sound head each having film feeding means and electrically operated instrumentalities having circuits, said film handling apparatus having a driving mechanism, means for detachably mounting said sound head upon said film handling apparatus, means extending from said sound head toward said apparatus for drivingly connecting said film feeding means of said sound head with said driving mechanism of said apparatus upon the assembly of said sound head with said apparatus, said connecting means and said driving mechanism being formed with co-operating devices for automatically latching the two into assembled relation when the sound head is placed upon the apparatus, and electrical connecting means extending between said sound head and said apparatus for automatically electrically connecting the circuits of said sound head and said apparatus upon the assembly of said sound head with said apparatus.

27. In an apparatus for alternatively handling a sound film and a silent film, a delivery carrier, a continuously operating take-up carrier, a gate disposed between said carriers, an intermittently operating member disposed between said carriers for feeding a film from said delivery carrier towards said take-up carrier through said gate, a resilient tensioning and auxiliary film feeding member engaging the film between said delivery carrier and said intermittent feeding means, said gate intermittent feeding member and resilient member associated with said delivery carrier forming a common path through which a silent film or a sound film may be alternatively threaded, a resilient film tensioning and auxiliary film feeding member engageable with a film between said intermittent feeding member and said take-up carrier for compensating for the difference in character of movement of said intermittent feeding member and said continuous take-up member, the section of the film under the influence of said auxiliary feeding member moving continuously but at differing rates of speed, said intermittent feeding member and said resilient film tensioning member associated with said take-up carrier forming a path especially adapted for a silent film, and a sound head disposed between said take-up carrier and said intermittent feeding member, said sound head including a member for continuously feeding the film at a constant rate, said continuous feeding member associated with said sound head being so disposed in relation to said take-up carrier and said intermittent feeding member that a path for a sound film is formed independently of and separately from said path for a silent film whereby one apparatus may be used interchangeably for both silent and sound films, each type of film being threaded through the said common path and the silent film being threaded through said first mentioned especial path wherein no portion moves at a constant rate and said sound film being threaded through said second especial sound path wherein it is moved at a constant rate.

28. In a film handling apparatus, means for forwardly projecting pictures in motion, a motor for driving said projecting means, a releasable connection between said motor and said projecting means, means for releasing said connection thereby stopping said projection in motion as in order to show a still picture and thereby taking the load of driving said motion picture projecting means off of said motor, resistance connectible in the circuit of said motor, means for connecting said resistance in said circuit, means for maintaining said resistance connected in said circuit during the period during which said connection is released and for maintaining said motor in operation, means for maintaining said resistance out of the circuit of said motor during the operation of said means for forwardly projecting pictures in motion, and control mechanism operatively interconnecting said resistance connecting means and said releasing means and containing devices for operating said resistance connecting means upon the operation of said releasing means whereby the speed of said motor is reduced during the period during which said connection is released whereby the noise and vibration of the motor and its current consumption are decreased.

29. In an apparatus which is adapted for alternatively handling sound and silent films, guiding members movable to positions wherein they establish a path in said apparatus through which a film of either type may be alternatively fed, means for moving said members in relation to said positions, mechanism for alternatively feeding a film of either type through said path, means for operating said mechanism in a projection direction for feeding a silent film through said path at a predetermined speed which is suitable for the projection of a silent film, alternative means for operating said mechanism in a projecting direction for feeding a sound film through said path at a predetermined speed greater than said first mentioned speed which is suitable for the projection of a sound film, a sound head, means for rendering said sound head operable upon a sound film which is being fed through said path, means for rendering said sound head inoperable upon a sound film, means for driving said projecting mechanism in a rewinding direction for rewinding a film through said path, means for rendering said projecting mechanism inoperative upon a film in said path, and control mechanism operatively interconnecting all of said means and including devices for selectively and predeterminedly operating each thereof.

30. In an apparatus for alternatively handling silent and sound motion pictures, a picture station, a sound head having an operable part, guides establishing a path for a film of either type past said picture station and said sound head, means having a plurality of operable parts which when moved to one position feed a film along said path and past said picture station and sound head at a fixed and predetermined speed suitable for a silent motion picture and maintain said sound head inoperative and when moved to another position feed a film along said path at a fixed and predetermined speed suitable for a sound film and render said sound head operative and when moved to another position rewind the film through said path and render said sound head inoperative, means for moving said parts to said positions, and control mechanism for said moving means, said control mechanism including a silent-projection-in-motion position, a sound-projection-in-motion position, and a rewinding position, a movable actuating member, and connections between said operable parts and said actuating member for moving said operable parts into a position corresponding to that into which said actuating member is moved.

31. In an apparatus adapted for alternatively handling silent and sound motion picture films, film-contacting means establishing a path of travel for a film of either type through said apparatus, means having control elements for feeding a film through said path at a speed of the order of sixteen frames per second as is suitable for a silent film, alternatively operable means having control elements for feeding a film through said path at a speed of the order of twenty-four frames per second as is suitable for a sound film, means having control elements for reproducing sound from a film while it is being fed through said path, and control mechanism operatively interconnecting said previously mentioned control elements and containing devices for necessarily maintaining said sound reproducing means inoperative except when the film is being fed through said path at a speed of the order of twenty-four frames per second.

32. In a film handling apparatus, a plurality of operable parts for moving a film through said apparatus, a motor for driving said parts, a resistance connectible in the circuit of said motor for operating said motor at a given level of power insufficient to drive said film moving parts, means for connecting said resistance in said circuit, means for disconnecting said resistance from said circuit for operating said motor at another and a higher given level of power sufficient to drive said film moving parts, a releasable connection between said motor and said film moving parts, and control mechanism operatively interconnecting said releasable connection and said resistance connecting means and said resistance disconnecting means and including devices which necessarily operate said connecting means for placing said resistance in said circuit during the period during which said releasable connection is released and said means for removing said resistance from said circuit during the period during which said releasable connection is operative whereby said motor necessarily receives sufficient power to drive said parts while it is connected thereto although its power is reduced when disconnected therefrom.

WARREN DUNHAM FOSTER.
FREDERICK DAVENPORT SWEET.